US011149503B2

(12) United States Patent
Thiemann

(10) Patent No.: US 11,149,503 B2
(45) Date of Patent: Oct. 19, 2021

(54) COMPENSATION SYSTEM FOR A TONG ASSEMBLY

(71) Applicant: Weatherford Technology Holdings, LLC, Houston, TX (US)

(72) Inventor: Bjoern Thiemann, Burgwedel (DE)

(73) Assignee: WEATHERFORD TECHNOLOGY HOLDINGS LLC, Houston, TX (US)

( * ) Notice: Subject to any disclaimer, the term of this patent is extended or adjusted under 35 U.S.C. 154(b) by 105 days.

(21) Appl. No.: 16/109,312

(22) Filed: Aug. 22, 2018

(65) Prior Publication Data

US 2020/0063507 A1 Feb. 27, 2020

(51) Int. Cl.
 *E21B 19/16* (2006.01)
 *G01L 5/24* (2006.01)
 *E21B 17/042* (2006.01)
 *E21B 17/00* (2006.01)

(52) U.S. Cl.
 CPC .......... *E21B 19/163* (2013.01); *E21B 19/164* (2013.01); *E21B 19/165* (2013.01); *E21B 17/006* (2013.01); *E21B 17/042* (2013.01); *E21B 19/16* (2013.01); *G01L 5/24* (2013.01)

(58) Field of Classification Search
 CPC ...... E21B 17/006; E21B 17/042; E21B 19/06; E21B 19/163; E21B 19/164; E21B 19/165; E21B 19/16; G01L 5/24
 See application file for complete search history.

(56) References Cited

U.S. PATENT DOCUMENTS

| 4,479,547 A * | 10/1984 | Boyadjieff | E21B 19/07 166/383 |
|---|---|---|---|
| 5,390,568 A * | 2/1995 | Pietras | E21B 19/16 81/57.16 |
| 6,056,060 A | 5/2000 | Abrahamsen et al. | |
| 6,536,520 B1 | 3/2003 | Snider et al. | |
| 7,707,913 B2 | 5/2010 | Halse | |
| 8,733,454 B2 | 5/2014 | Bouligny et al. | |
| 9,404,322 B2 | 8/2016 | Wiedecke et al. | |
| 9,476,268 B2 | 10/2016 | Pratt et al. | |
| 2003/0221871 A1 * | 12/2003 | Hamilton | E21B 19/14 175/85 |
| 2004/0195555 A1 * | 10/2004 | Bangert | E21B 19/165 254/418 |
| 2007/0079671 A1 * | 4/2007 | Halse | E21B 19/164 81/57.16 |
| 2008/0093088 A1 * | 4/2008 | Hopwood | E21B 19/165 166/379 |
| 2008/0264648 A1 | 10/2008 | Pietras et al. | |
| 2012/0152530 A1 * | 6/2012 | Wiedecke | E21B 19/07 166/250.01 |
| 2012/0304832 A1 * | 12/2012 | Hitchcock | E21B 19/166 81/90.3 |

(Continued)

OTHER PUBLICATIONS

PCT International Search Report and Written Opinion dated Nov. 8, 2019, for International Application No. PCT/US2019/047299.

*Primary Examiner* — Christopher J Sebesta
(74) *Attorney, Agent, or Firm* — Patterson + Sheridan, LLP

(57) ABSTRACT

A method of making a connection between a first tubular and a second tubular includes gripping the first tubular using a power tong; gripping the second tubular using a backup tong; applying a torque to the first tubular using a power tong; and moving the power tong at a predetermined speed to compensate for a weight of the power tong.

20 Claims, 4 Drawing Sheets

(56) References Cited

U.S. PATENT DOCUMENTS

| | | | |
|---|---|---|---|
| 2014/0124218 A1* | 5/2014 | Pilgrim | E21B 44/02 166/380 |
| 2014/0231093 A1* | 8/2014 | Hoell | E21B 43/121 166/372 |
| 2014/0338174 A1 | 11/2014 | Mikalsen | |
| 2015/0101826 A1* | 4/2015 | Gupta | E21B 19/164 166/377 |
| 2018/0149175 A1* | 5/2018 | Zapico | F15B 13/0401 |

* cited by examiner

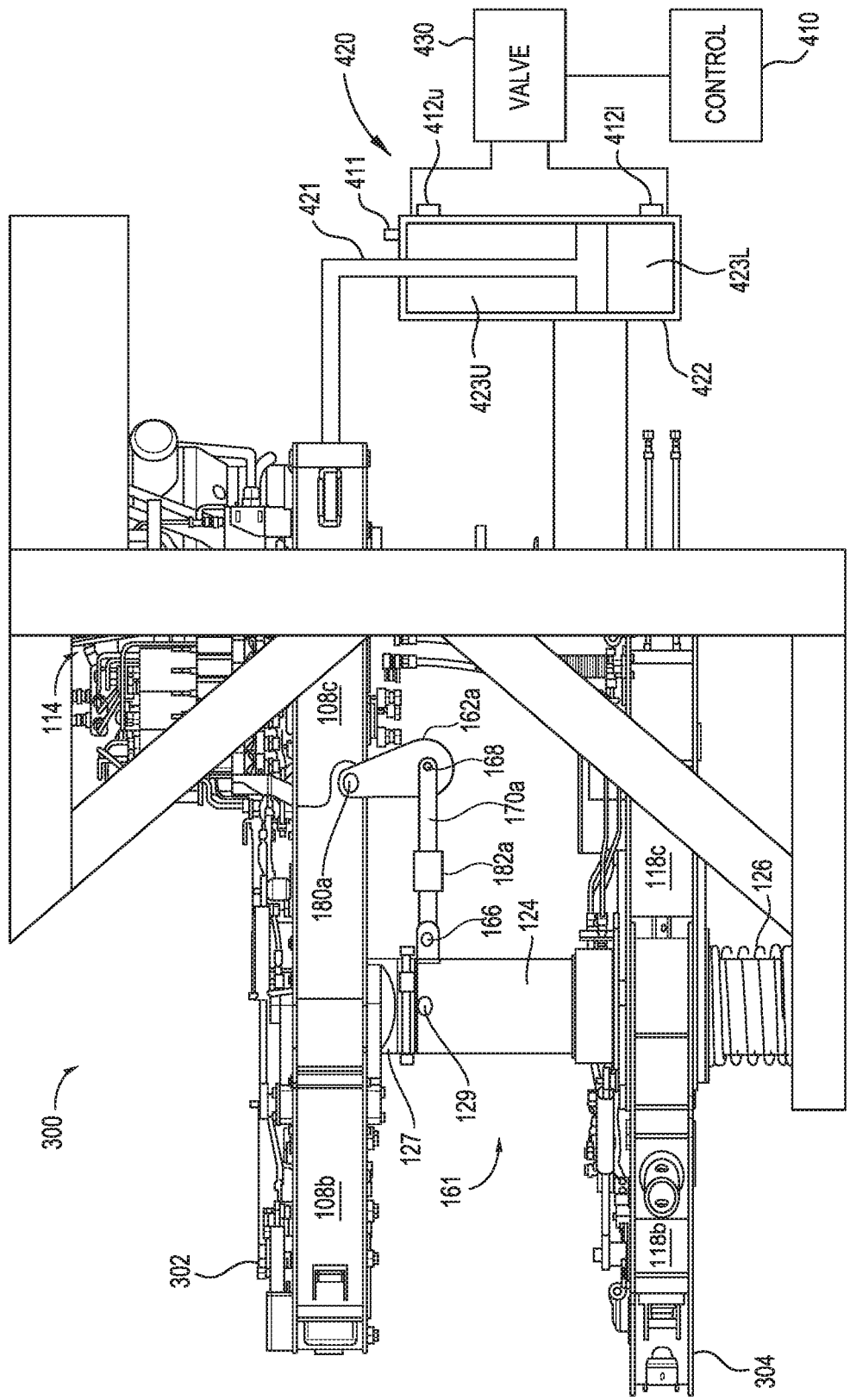

COMPENSATION SYSTEM FOR A TONG ASSEMBLY

BACKGROUND OF THE DISCLOSURE

Field of the Disclosure

The present disclosure generally relates to methods and apparatus for making up and breaking out tubular connections. More particularly, embodiments of the present disclosure relate to a compensation system for a tong assembly during make up or break out of tubular connections.

Description of the Related Art

Construction of oil or gas wells usually requires making long tubular strings that make up casing, risers, drill pipe or other tubing. Due to the length of these strings, sections or stands of tubulars are progressively added to the tubular string as it is lowered from a drilling platform. In particular, applying slips of a spider located in the floor of the drilling platform usually restrains the tubular string from falling down the wellbore when it is desired to add a section or stand of tubular. The new section or stand of tubular is then moved from a rack to above the spider. The threaded pin of the section or stand of tubular to be connected is then located over the threaded box of the tubular string and a connection is made up by rotation therebetween. Thereafter, the spider releases the newly extended tubular string, and the whole tubular string lowers until the top of the tubular string is adjacent the spider whereupon the slips of the spider reapply to maintain the position of the tubular string for repeating the process.

It is common practice to use a tong assembly to apply a predetermined torque to the connection in order to make this connection. The tong assembly is typically located on the platform, either on rails, or hung from a derrick on a chain. In order to make up or break out a threaded connection, the tong assembly includes a two tong arrangement. An active (or power) tong supplies torque to the section of tubular above the threaded connection, while a passive (or backup) tong supplies a reaction torque to a lower tubular below the threaded connection. Particularly, the backup tong clamps the lower tubular below the threaded connection and prevents it from rotating. The clamping of the tubulars may be performed mechanically, hydraulically, or pneumatically. The power tong clamps the upper tubular and is driven so that it supplies torque for at least a limited angle to make up the tubular connection.

As the thread is made up between tubulars, the upper tubular is moved closer to the lower tubular. The power tong is allowed to move with the upper tubular during the makeup process. Typically, the weight of the power tong is compensated to reduce the forces acting on the threads. In general, the weight of the tong is generally manually set prior to the makeup process.

Therefore, there is a need for a compensation system and methods of compensating the weight of a tong for a tubular connection process.

SUMMARY OF THE DISCLOSURE

The present disclosure generally relates to a tong assembly for making up and breaking out a tubular connection such as a connection between two tubulars in a tubular string.

In one embodiment, a method of making a connection between a first tubular and a second tubular includes gripping the first tubular using a power tong; gripping the second tubular using a backup tong; applying a torque to the first tubular using a power tong; and moving the power tong at a predetermined speed to compensate for a weight of the power tong.

In another embodiment, a method of making a connection between a first tubular and a second tubular includes rotating the first tubular using a power tong; gripping the second tubular using a backup tong; and compensating for a weight of the power tong based on a pitch of the thread of the first tubular and a turn rate of the first tubular.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2 is a tong assembly according to embodiments disclosed herein.

DETAILED DESCRIPTION

The present disclosure generally relates to a tong assembly for making up and breaking out a tubular connection such as a connection between two tubulars in a tubular string. The tubular strings may be made of tubulars that form risers, casings, drill pipes or other tubulars in oil and gas wells. Embodiments of the present disclosure relates to a tong assembly having a power tong, a backup tong and a compensation system having a cylinder assembly. In some embodiments, the cylinder assembly is configured to move the power tong downward during the make, up process and the length of retraction of the cylinder assembly is measured.

Figure 1A:
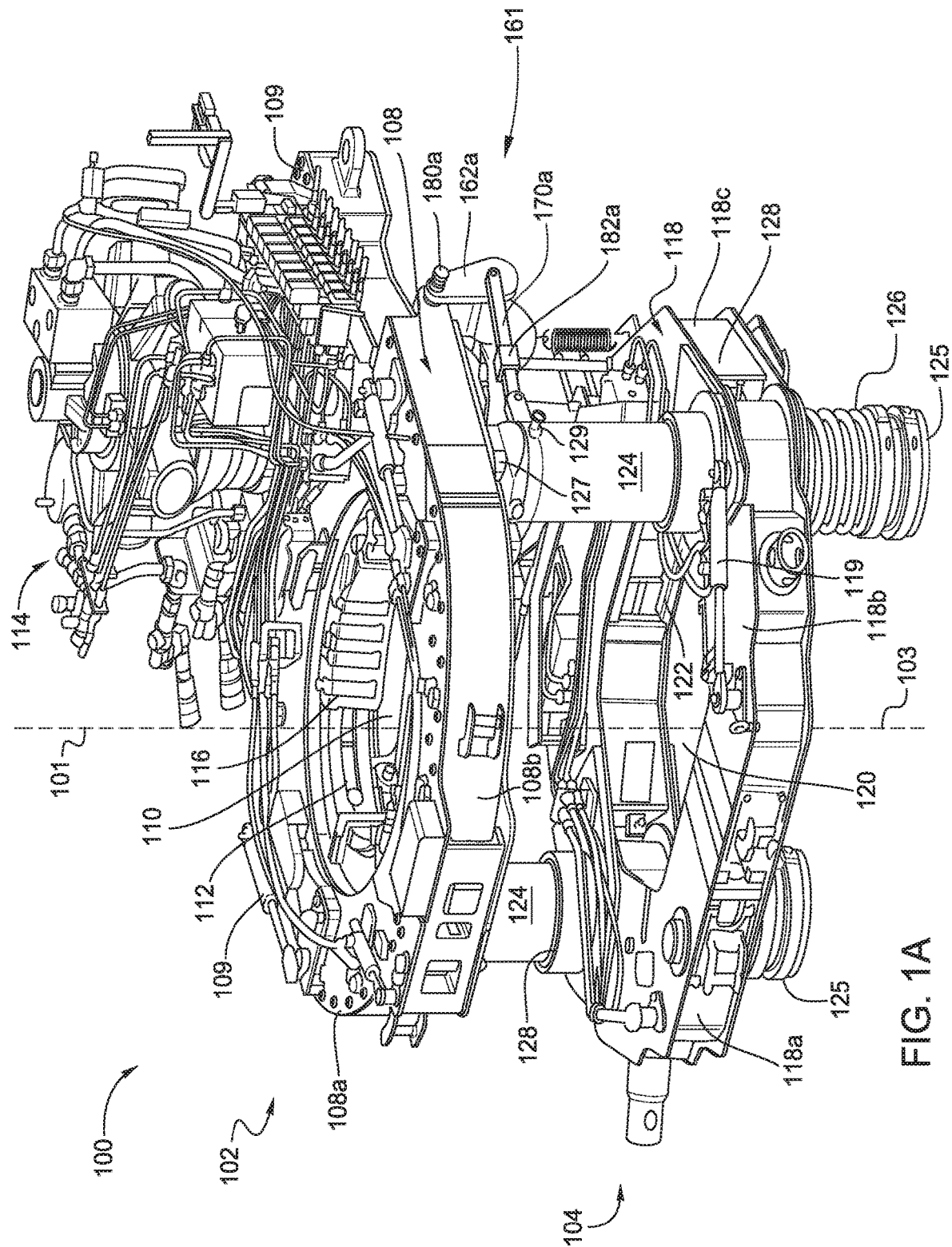
FIG. 1A is a schematic perspective view of a tong assembly according to one embodiment of the present disclosure.
Figure 1B:
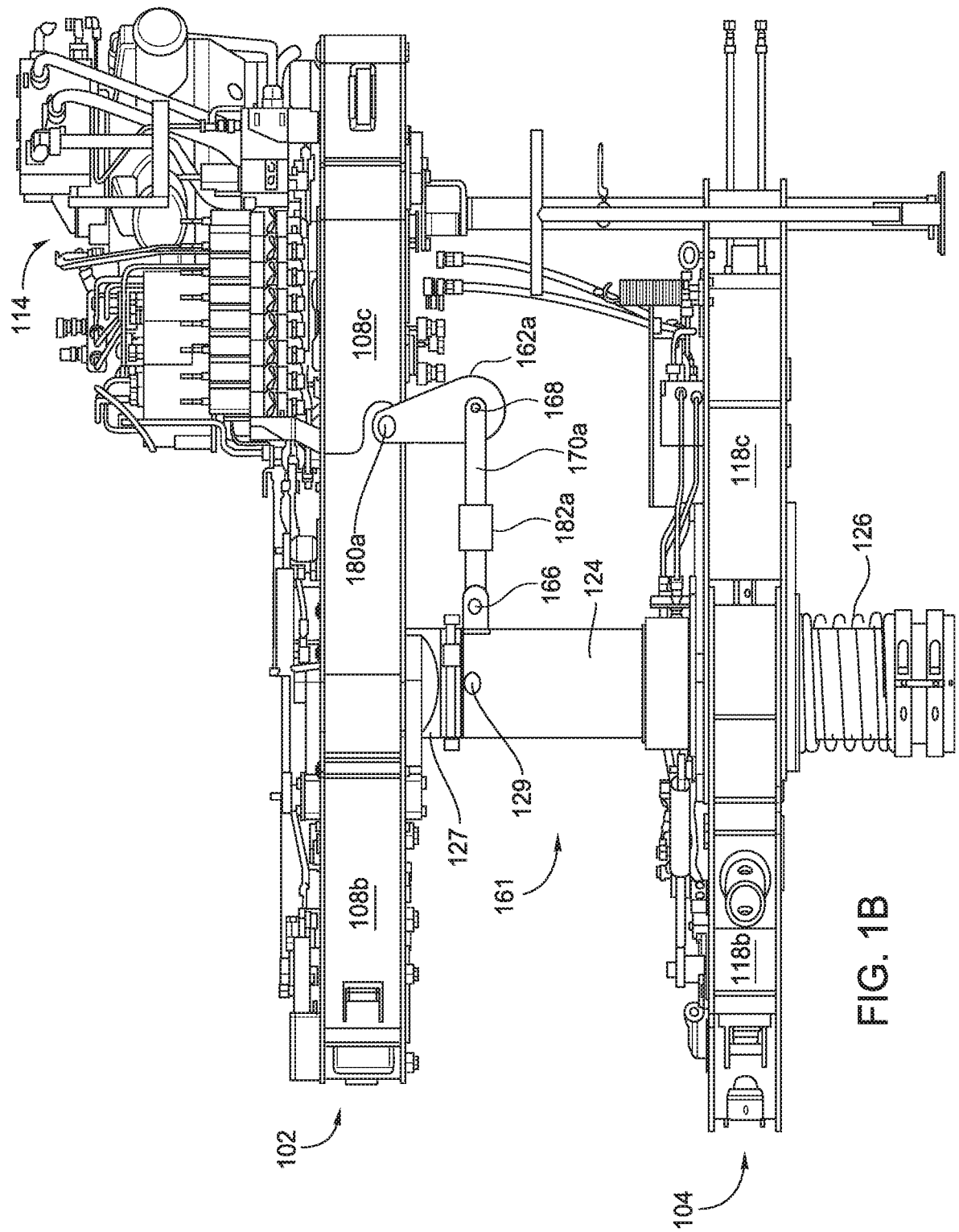
FIG. 1B is a schematic side view of the tong assembly of FIG. 1A.

FIG. 1A illustrates an embodiment of a tong assembly 100 according to one embodiment of the present disclosure. FIG. 1B is a schematic side view of the tong assembly 100. The tong assembly 100 includes a power tong 102 and a backup tong 104. In operation, the power tong 102 may be suspended from a handling tool or supported by a stand. The power tong 102 and the backup tong 104 may be connected by a load transfer assembly 161.

The power tong 102 may include a frame 108 with a central opening 110 for receiving a tubular. The frame 108 may include two or more sections movable relative to each other to open and close the central opening 110. In one embodiment, the frame 108 may include two front sections 108a, 108b and one back section 108c. The front sections 108a, 108b are connected to the back section 108 by hinges and pivotable about the back section 108c. In one embodiment, the front sections 108a, 108b may be pivoted by pistons 109.

The power tong 102 may further include a rotor 112 disposed in the frame 108. The rotor 112 may be a segmented rotor. The rotor 112 may be coupled to a motor assembly 114. Jaws 116 may be attached to an inner diameter of the rotor 112. The jaws 116 may rotate with the rotor 112 to rotate a tubular about a central axis 101 during makeup and breakout of a tubular connection. The jaws 116 may move radially relative to the frame 108 to secure and release a tubular or to accommodate tubulars of various diameters. In one embodiment, the jaws 116 may be driven using a hydraulic circuit.

The backup tong 104 may be disposed underneath the power tong 102. The backup tong 104 may include a frame 118 with a central opening 120 for receiving a tubular. The frame 118 may include two or more sections movable relative to each other to open and close the central opening 120. In one embodiment, the frame 118 may include two front sections 118a, 118b and one back section 118c. The front sections 118a, 118b are connected to the back section 118 by hinges and pivotable about the back section 118c. In one embodiment, the front sections 118a, 118b may be pivoted by pistons 119. The backup tong 104 may include jaws 122 attached to the frame 118. The jaws 122 may move radially relative to the frame 118 to secure and release a tubular or to accommodate tubular of various diameters. In one embodiment, the jaws 122 may be driven using a hydraulic circuit.

The frame 118 of the backup tong 104 may be movably coupled to support legs 124. Lower ends 125 of the support legs 124 are configured to stand a platform or other stationary planes. The support legs 124 support the backup tong 104 and prevent the backup tong 104 from rotating during operation. In one embodiment, the frame 118 has through openings for receiving the support legs 124 therein. In one embodiment, the frame 118 may include sleeves 128 for receiving the support legs 124. In one embodiment, the frame 118 may be coupled to two support legs 124 that are symmetrically positioned about a central axis 103 of the backup tong 104. In one embodiment, the central axis 103 and central axis of the two support legs 124 may be within the same plane. Each support leg 124 may include a spring member 126 disposed at lower ends 125. Weight and vertical load of the backup tong 104 may rest on the spring members 126. The spring members 126 allow the backup tong 104 to be movable along the support legs 124 thus providing structure flexibility.

Figure 1C:
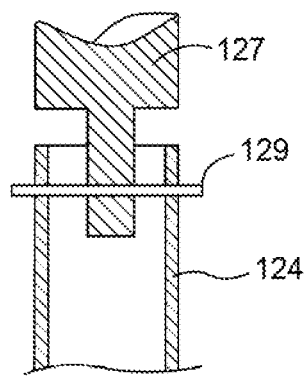
FIG. 1C is a schematic partial sectional view of a support leg of the tong assembly of FIG. 1A.

In one embodiment, the power tong 102 may include alignment posts 127 extending from a lower side of the frame 108. When the tong assembly 100 is assembled, the alignment posts 127 may be inserted into the support legs 124 so that the central axis 101 of the power tong 102 and the central axis 103 of the backup tong 104 may be substantially aligned (see FIG. 1C). The inner diameter of the support legs 124 is substantially larger than the outer diameter of the alignment posts 127 so that the power tong 102 may move relative to the backup tong 104 within a limited range without the alignment posts 127 contacting the support legs 124. When the alignment posts 127 do not contact the support legs 124, torsion and force are not transmitted between the support legs 124 and the alignment posts 127. In one embodiment, during assembly or transportation, pins 129 may be used to couple the alignment posts 127 to the support leg 124. However, during operation, the pins 129 are removed to allow relative movements between the power tong 102 and the backup tong 104 and avoid transmission of load between the alignment posts 127 and the support legs 124.

Figure 1D:
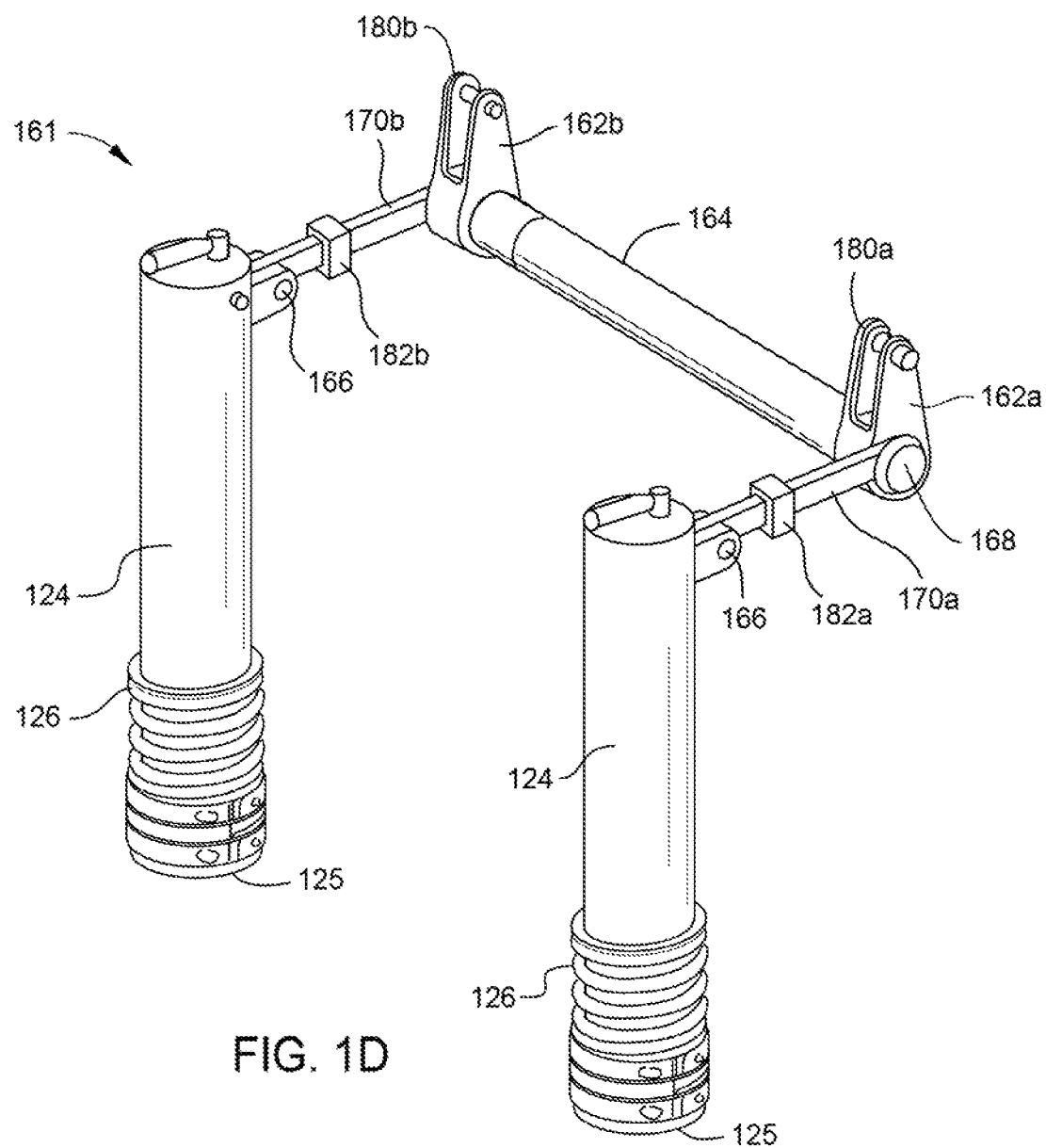
FIG. 1D schematically illustrates a load transfer assembly of the tong assembly of FIG. 1A.

The power tong 102 and the backup tong 104 are connected through the load transfer assembly 161. The load transfer assembly 161 may include two arms 162a, 162b, two links 170a, 170b, and a torque bar 164 (see FIG. 1D). The two arms 162a, 162b are coupled to the sides of the power tong 102 and extend downward from the power tong 102. The arms 162a, 162b may be pivotally coupled to the power tong 102 by pivot connections 180a, 180b, respectively. The pivot connections 180a, 180b may be located equidistant from the central axis 101. The torque bar 164 couples the lower portion of the two arms 162a, 162b. The links 170a, 170b are coupled between the support legs 124 and the arms 162a, 162b. Each link 170a, 170b is coupled to the corresponding support leg 124 by a pivot connection 166. Each link 170a, 170b is coupled to the corresponding arm 162a, 162b by a pivot connection 168.

When power tong 102 applies a torque to rotate a first tubular causing a joint between the first tubular and a second tubular held by the backup tong 104 to tighten or loosen, the load transfer assembly 161, coupled to the power tong 102 and the backup tong 104, provides reaction torques to prevent the power tong 102 from moving relative to the backup tong 104 along a horizontal plane. For example, during makeup, the torque applied by the power tong 102 creates a reaction force which, because of the torque bar 164 and the arms 162a, 162b, results in substantially equal and opposite movements being applied to the backup tong 104 via the links 170a, 170b.

In some embodiments, each arm 162a, 162b includes a load cell 182a, 182b configured to measure the torque applied to the tubular connection. In one embodiment, the load cells 182a, 182b are integrated in the respective arm 162a, 162b. In another embodiment, the load cells 182a, 182b are attached to the respective arm 162a, 162b. The load cells 182a, 182b may be configured to measure data related to the force applied to a connection during makeup or breakout. The load cell 182a, 182b may be configured to measure the applied force in tension or compression. In one embodiment, the first load cell 182a is configured to measure the applied force in tension during makeup, while the second load cell 182b is configured to measure the applied force in compression during makeup. During breakout, the second load cell 182b is configured to measure the applied force in tension, while the first load cell 182a is configured to measure the applied force in compression.

As the thread is made up between tubulars, the upper tubular is moved closer to the lower tubular. The power tong 102 is allowed to move with the upper tubular during the makeup process to reduce the load applied to the upper tubular, which reduces the forces acting on the threads. In addition, the weight of the power tong 102 is compensated to remove the weight of the power tong 102 acting on the threads.

FIG. 2 illustrates an exemplary embodiment of a tong assembly 300 equipped with a compensation system. In this embodiment, the compensation system includes a piston and cylinder assembly 420 for moving the power tong 302 relative to the backup tong 304, a pressure control valve 430 for operating the piston and cylinder assembly 420, pressure sensors 412U, 412L for measuring the pressure of the piston and cylinder assembly ("PCA") 420, and a length sensor 411 for measuring the length of the retraction or the extension of the piston 421 relative to the cylinder 422. The pressure sensors 412U, 412L, the length sensor 411, and flow control valve 430 are in communication with a controller 410. The controller 410 may also control operation of the power tong 302 and the backup tong 304 and be in communication with other devices of the tong assembly, such as the load cells 182a, 182b.

As shown in FIG. 2, the piston 421 divides the cylinder 422 into an upper chamber 423U and a lower chamber 423L. The upper pressure sensor 412U measures the pressure in the upper chamber 423U, the lower pressure sensor 412L measures the pressure in the lower chamber 423L. The measured pressures are communicated to the controller 410, which operates the control valve 430 in response to the measured pressures. Depending on the operation, the controller 410 may open the valve 430 to inject pressurized fluid into the upper or lower chambers 423U, 423L. Exemplary pressurized fluids include hydraulic fluid and pneumatic fluid. In another embodiment, the PCA may be electrically operated, such as using an electro-mechanical linear actuator.

Prior to the operation, the valve 430 is set to the weight of the power tong 302 such that the PCA 420 supports the weight of the power tong 302. In this respect, a substantial portion of the weight of the power tong 302 is supported by the PCA 420. For example, at least 80%, at least 90%, or at least 95% of the weight of the power tong 302 is borne by the PCA 420. The backup tong 304 grips the lower tubular, and the power tong 302 grips the upper tubular to be connected to the lower tubular. The pin end of the upper tubular may be resting on the box end of the lower tubular. During makeup, the power tong 302 rotates the upper tubular relative to the lower tubular. Makeup of the threads causes a downward force to be applied to the power tong 302. This change in load causes an increase in load supported by the PCA 420 and a pressure change in the PCA 420. In turn, the valve 430 opens the lower chamber 423L to allow fluid in the lower chamber 423L to flow out so the piston 421 can retract. Retraction of the piston 421 moves the power tong 302 downwardly to compensate for the change in load. The valve 430 will close when the load is reduced to the set pressure.

In one embodiment, the power tong 302 automatically moves downward during a makeup operation. Prior to the operation, the valve 430 is set to the weight of the power tong 302 such that the PCA 420 supports weight of the power tong 302. The backup tong 304 grips the lower tubular, and the power tong 302 grips the upper tubular to be connected to the lower tubular. The pin end of the upper tubular may be resting on the box end of the lower tubular. During makeup, the power tong 302 rotates the upper tubular relative to the lower tubular. The pressure in the PCA 420 is controlled so the power tong 302 automatically moves downward. In this respect, the power tong 302 moves downward without waiting for a load increase due to thread makeup.

In one example, the length sensor 411 can monitor the speed at which the piston 421 retracts. The control valve 430 slowly decreases the pressure in the lower chamber 423L to allow the piston 421 to retract. If the piston 421 is retracting too fast, the pressure in the lower chamber 423L is adjusted to slow down the piston 421 retraction. For example, the pressure in the lower chamber 423L may be increased. If the piston 421 is not retracting fast enough, the pressure in the upper chamber 423L may be increased, the pressure in the lower chamber 423L may be decreased, or both. In one example, the retraction of the piston 421 is controlled by the PCA 420 so that the power tong 302 moves continuously downward at a constant speed. In another example, retraction of the piston 421 is controlled so that the power tong 302 moves continuously downward, but at different speeds. For example, the power tong 302 may slow down as the makeup nears completion. A memory of the controller 410 or an external memory may store connection data from the length sensor 411, the upper pressure sensor 412U, and the lower pressure sensor 412L. The stored data may include position and speed of the piston 421, pressure in the upper chamber 423U, and pressure in the lower chamber 423L for each connection. The stored data may include valve position data or state information for the control valve 430 for each connection. The stored data may include the turn rate of the upper pipe for each connection. The stored data may include data from previous connections on the same job or from connections on previous jobs. The stored data may be classified according to the pipe specification including the pitch of the threads for each connection. The stored data may be grouped using a cluster analysis technique. The controller 410 may use the stored data to generate instructions to operate the control valve 430 in order to control pressure in the PCA 420 and in order to control downward movement of the power tong 302. From the stored data for each connection, the controller 410 may determine a selected connection and use the stored data from the selected connection to generate the instructions for the next connection. The controller 410 may determine the selected connection according to any of the following criteria: the connection having the minimum change in pressure in the upper chamber 423U or the lower chamber 423L; the connection having the minimum pressure gradient in the upper chamber 423U or the lower chamber 423L. The instructions for the next connection may be based on the valve position data for the control valve 430 stored for the selected connection. The controller 410 may operate the control valve 430 during the next connection to repeat the valve position data for the control valve 430 and repeat the downward movement of the power tong 302 from the selected connection thus compensating for the change in load on the power tong 302 as the next connection is made.

In another embodiment, compensation of the power tong 302 is based on the pitch of the thread on the tubulars and the corresponding turns of the power tong 302. For example, prior to makeup, the pitch of the thread of the tubulars is determined by reviewing the specifications of the tubulars, such as casings, to be made up. Also, the number of turns and the rate of turning of the upper tubular will be preset based on the specifications of the tubulars. Because the pitch of the thread and the turn rate are known, the linear speed of the upper tubular moving downward can be determined. The PCA 420 can be operated to move the power tong downward at the linear speed to compensate for the weight of the power tong. For example, the PCA 420 can control the retraction of the piston 421 at the calculated linear speed to compensate for the weight of the power tong 302 during makeup.

While descriptions herein refer to makeup operation, compensation of the power tong 302 is equally applicable to a breakout operation.

In another embodiment, the weight of the power tong is set after the backup tong clamps the lower tubular. The tong assembly is initially positioned on the floor next to the lower tubular. The tong assembly is supported by its legs 124, which is provided with springs 126. Then, the backup tong 304 grips the lower tubular. After gripping the lower tubular, the axial position of the backup tong 304 relative to the lower tubular is fixed. The backup tong 304 is not axially movable on the springs 126. Thereafter, the control valve 430 is set to the weight of the power tong 302 such that the PCA 420 supports the weight of the power tong 302.

The backup tong 304 grips the lower tubular, and the power tong 302 grips the upper tubular to be connected to the lower tubular. The pin end of the upper tubular may be resting on the box end of the lower tubular. During makeup, the power tong 302 rotates the upper tubular relative to the lower tubular. Makeup of the threads causes a downward force to be applied to the power tong 302. This change in load causes a pressure change in the PCA 420. In turn, the PCA 420 is operated to allow the power tong 302 to move downward. In another example, the power tong 302 is allowed to move continuously downward during makeup without waiting for the change in load. In yet another example, the power tong 302 is allowed to move continuously downward based on a liner speed determined from the pitch of the thread, the expected number of turns of the upper tubular, and the expected turn rate of the upper tubular.

In one embodiment, a method of making a connection between a first tubular and a second tubular includes gripping the first tubular using a power tong; gripping the second tubular using a backup tong; applying a torque to the first tubular using a power tong; and moving the power tong at a predetermined speed to compensate for a weight of the power tong.

In one or more of the embodiments described herein, moving the power tong comprises using a piston and cylinder assembly to move the power tong, the piston and cylinder assembly having a piston movable in a cylinder.

In one or more of the embodiments described herein, moving the power tong comprises retracting the piston relative to the cylinder.

In one or more of the embodiments described herein, moving the power tong comprises moving the power tong in response to the rate of retraction.

In one or more of the embodiments described herein, the method includes communicating the measured rate of retraction to a control valve for operating the piston and cylinder assembly.

In one or more of the embodiments described herein, the method includes setting the weight of the power tong for compensation.

In one or more of the embodiments described herein, the weight is set after the backup tong grips the second tubular.

In one or more of the embodiments described herein, the method includes determining a pitch of a thread on the first tubular, and determining a rate of turn of the first tubular during makeup.

In one or more of the embodiments described herein, the method includes using the pitch and the rate of turn to determine the speed of the power tong.

In another embodiment, a method of making a connection between a first tubular and a second tubular includes rotating the first tubular using a power tong; gripping the second tubular using a backup tong; and compensating for a weight of the power tong based on a pitch of the thread of the first tubular and a turn rate of the first tubular.

In one or more of the embodiments described herein, compensating the weight comprises using a piston and cylinder assembly to move the power tong downward.

In one or more of the embodiments described herein, the power tong is moved at a speed determined from the pitch and the turn rate.

In one or more of the embodiments described herein, the method includes setting a weight of the power tong for compensation after the backup tong grips the second tubular.

In one or more of the embodiments described herein, the method includes setting a weight of the power tong for compensation.

In one or more of the embodiments described herein, the weight is set after the backup tong grips the second tubular.

While the foregoing is directed to embodiments of the present disclosure, other and further embodiments may be devised without departing from the basic scope thereof, and the scope of the present disclosure is determined by the claims that follow.

The invention claimed is:

1. A method of making or breaking a connection between a first tubular and a second tubular, comprising:
gripping the first tubular using a power tong;
gripping the second tubular using a backup tong;
utilizing a piston and cylinder assembly to support the weight of the power tong, wherein the cylinder includes a chamber disposed at an end of the piston;
utilizing a controller to monitor a set pressure in the chamber during make-up or breakout of the connection;
applying a torque to the first tubular using the power tong, thereby causing an upwards or downwards movement of the power tong and the piston and a corresponding increase or decrease in pressure in the chamber; and
as the power tong moves, utilizing the controller to act in conjunction with a control valve to maintain the set pressure, comprising:
selecting a connection from stored connection data recorded during one or more previous connections, wherein data from the selected connection comprises at least one of a minimum change in pressure in the chamber or a minimum pressure gradient in the chamber for the one or more previous connections; and
using data from the selected connection to generate instructions for operating the control valve.

2. The method of claim 1, wherein when breaking out a connection, maintaining the set pressure includes adding fluid to the chamber.

3. The method of claim 1, wherein when making up a connection, maintaining the set pressure includes removing fluid from the chamber.

4. The method of claim 3 wherein the piston and cylinder assembly is oriented vertically, and the chamber is a lower chamber, disposed below the piston.

5. The method of claim 4 wherein the cylinder further includes an upper chamber disposed above the piston;
wherein when breaking out a connection, maintaining the set pressure includes removing the fluid from the upper chamber; and
wherein when making up a connection, maintaining the set pressure includes adding fluid to the upper chamber.

6. The method of claim 1, further comprising determining a rate of retraction of the piston relative to the cylinder.

7. The method of claim 6, wherein moving the power tong comprises moving the power tong in response to the rate of retraction.

8. The method of claim 7, further comprising communicating the measured rate of retraction to the control valve for operating the piston and cylinder assembly.

9. The method claim 1, further comprising setting the weight of the power tong for compensation, wherein the weight is set after the backup tong grips the second tubular.

10. The method of claim 1, further comprising determining a pitch of a thread on the first tubular, and determining a rate of turn of the first tubular during makeup.

11. The method of claim 10, further comprising using the pitch and the rate of turn to determine a linear speed of the power tong.

12. The method claim 11, further comprising setting a weight of the power tong for compensation after the backup tong grips the second tubular.

13. A method of making a connection between a first tubular and a second tubular, comprising:
rotating the first tubular using a power tong;
gripping the second tubular using a backup tong, wherein during rotation of the first tubular, a load transfer assembly applies a reaction force to the backup tong, the load transfer assembly including:
a pair of support legs coupled to the backup tong; and
a torque bar coupled between the support legs and the power tong; and
compensating for a weight of the power tong using a compensation system having a cylinder assembly for moving the power tong relative to the backup tong, wherein the compensating includes;
determining a linear speed of the first tubular relative to the second tubular based on a pitch of the thread of the first tubular and a turn rate of the first tubular;
monitoring a rate of retraction of the cylinder assembly using a length sensor; and
controlling the rate of retraction of the cylinder assembly based on the monitoring, wherein the rate of retraction is controlled to maintain the determined linear speed during rotation of the first tubular.

14. The method claim 13, further comprising setting a weight of the power tong for compensation after the backup tong grips the second tubular.

15. The method claim 13, wherein the cylinder assembly comprises a piston and a cylinder, and wherein retracting the cylinder assembly includes removing a fluid from a chamber of the cylinder.

16. The method of claim 13, wherein the turn rate of the first tubular is preset, and wherein the linear speed is determined before rotation of the first tubular.

17. The method of claim 16, wherein a number of turns of the first tubular is preset, and wherein the rate of retraction of the cylinder assembly is determined before rotation of the first tubular.

18. The method of claim 13, further comprising:
utilizing a controller to monitor pressure in a chamber of the cylinder assembly;
selecting a connection from stored connection data recorded during one or more previous connections, wherein data from the selected connection comprises at least one of a minimum change in pressure in the chamber or a minimum pressure gradient in the chamber for the one or more previous connections; and
controlling the rate of retraction of the cylinder assembly based, at least in part, on data from the selected connection.

19. A method of making or breaking a connection between a first tubular and a second tubular, comprising:
rotating the first tubular using a power tong;
gripping the second tubular using a backup tong, wherein during rotation of the first tubular, a load transfer assembly applies a reaction force to the backup tong, the load transfer assembly including:
a pair of support legs coupled to the backup tong; and
a torque bar coupled between the support legs and the power tong;
actuating a piston and cylinder assembly to move the power tong relative to the backup tong at a predetermined linear speed;
during actuation of the piston and cylinder assembly, determining a position and an actual linear speed of the power tong relative to the backup tong by measuring an extension length of the piston relative to the cylinder using a length sensor; and
controlling the actual linear speed of the power tong to match the predetermined linear speed by adjusting fluid pressure in an upper or lower part of the cylinder, wherein the fluid pressure is adjusted according to a comparison between the actual linear speed and the predetermined linear speed.

20. The method of claim 19, further comprising:
utilizing a controller to monitor the fluid pressure in the upper or lower part of the cylinder;
selecting a connection from stored connection data recorded during one or more previous connections, wherein data from the selected connection comprises at least one of a minimum change in pressure in the upper or lower part of the cylinder or a minimum pressure gradient in the upper or lower part of the cylinder for the one or more previous connections; and
controlling extension of the piston relative to the cylinder based, at least in part, on data from the selected connection.

* * * * *